(12) United States Patent
Slovetskiy (10) Patent No.: US 12,093,751 B2
(45) Date of Patent: Sep. 17, 2024

(54) PRESERVING EVENTUALLY CONSISTENT DISTRIBUTED STATE OF MULTI-LAYER APPLICATIONS

(71) Applicant: T-Mobile USA, Inc., Bellevue, WA (US)

(72) Inventor: Sergey Slovetskiy, Bellevue, WA (US)

(73) Assignee: T-MOBILE USA, INC., Bellevue, WA (US)

( * ) Notice: Subject to any disclaimer, the term of this patent is extended or adjusted under 35 U.S.C. 154(b) by 538 days.

(21) Appl. No.: 16/931,375

(22) Filed: Jul. 16, 2020

(65) Prior Publication Data

US 2022/0019485 A1 Jan. 20, 2022

(51) Int. Cl.
*G06F 9/52* (2006.01)
*G06F 8/65* (2018.01)
*G06F 9/54* (2006.01)

(52) U.S. Cl.
CPC .................. *G06F 9/52* (2013.01); *G06F 8/65* (2013.01); *G06F 9/547* (2013.01)

(58) Field of Classification Search
CPC .............................. G06F 8/65; G06F 9/52–547
See application file for complete search history.

(56) References Cited

U.S. PATENT DOCUMENTS

| 2011/0320407 | A1* | 12/2011 | Augustine | G06F 16/2315 |
| | | | | 707/E17.005 |
| 2017/0026301 | A1* | 1/2017 | Keller | H04L 47/621 |
| 2019/0004969 | A1* | 1/2019 | Orogvany | G06F 3/067 |
| 2019/0005100 | A1* | 1/2019 | Jäger | G06F 16/2471 |
| 2020/0389521 | A1* | 12/2020 | Brock | H04L 9/50 |
| 2021/0126986 | A1* | 4/2021 | Rolf | H04L 67/52 |
| 2021/0200771 | A1* | 7/2021 | Kuang | G06F 16/2379 |
| 2022/0124593 | A1* | 4/2022 | Mátray | H04W 36/32 |

FOREIGN PATENT DOCUMENTS

WO WO-2022010388 A1 * 1/2022

OTHER PUBLICATIONS

Scalable and Reliable Middlebox Deployment Milad Ghaznavi; publicly available: May 28, 2020 hdl.handle.net/10012/15947 (Year: 2020).*

(Continued)

*Primary Examiner* — Emerson C Puente
*Assistant Examiner* — Paul V Mills (57) ABSTRACT

A computing device operates a first thread for a first layer of a plurality of layers of an application that are operated by different threads. The computing device maintains a first parameter that is shared by the first layer of the application and a second layer of the application. The second layer is operated by a second thread that is identified by a first address. When the first parameter is locally updated at the first thread, the computing device updates a local copy of the first parameter at the first thread and providing the locally updated first parameter to the second thread by using the first address. When the first parameter is remotely updated at the second thread, the computing device receives the remotely updated first parameter and updating the local copy of the first parameter at the first thread based on the received remotely updated first parameter.

12 Claims, 6 Drawing Sheets

(56) References Cited

OTHER PUBLICATIONS

Conflict-Free Replicated Data Types in Dynamic Environments António José Sá Barreto (Year: 2019).*

Conflict-free Partially Replicated Data Types Iwan Briquemont, Manuel Bravo, Zhongmiao Li, and Peter Van Roy (Year: 2015).*

Difference Between Broadcast and Multicast TechDifferences.com article Retrieved: techdifferences.com/difference-between-broadcast-and-multicast.html (Year: 2019).*

Cloudburst: Stateful Functions-as-a-Service Vikram Sreekanti, Chenggang Wu, Xiayue Charles Lin, Johann Schleier-Smith, Jose M. Faleiro, Joseph E. Gonzalez, Joseph M. Hellerstein, Alexey Tumanov; Document version 2 arxiv.org/abs/2001.04592v2 (Year: 2020).*

Optimising Client-side Geo-replication with Partially Replicated Data Structures Iwan Briquemont Universite Catholique De Louvain; Master's thesis (Year: 2014).*

Write Fast, Read in the Past: Causal Consistency for Client-Side Applications Marek Zawirski, Sérgio Duarte, Annette Bieniusa, Valter Balegas, Marc Shapiro (Year: 2015).*

Correctness and Performance for Stateful Chained Network Functions Junaid Khalid Aditya Akella (Year: 2018).*

CloudPath: A Multi-Tier Cloud Computing Framework Seyed Hossein Mortazavi, Mohammad Salehe, Carolina Simoes, Gomes, Caleb Phillips, Eyal de Lara (Year: 2017).*

Akka CRDT: An Eventually Consistent REST/JSON database using CRDTs, Akka Cluster and LevelDB Jonas Bonér github.com/jboner/akka-crdt (Year: 2016).*

Impact of Adaptive Consistency on Distributed SDN Applications: An Empirical Study Ermin Sakic and Wolfgang Kellerer (Year: 2018).*

M. Shapiro, N. Preguiça, C. Baquero, and M. Zawirski, "A comprehensive study of Convergent and Commutative Replicated Data Types," p. 51., Jan. 2011. Retrieved from URL: <https://www.researchgate.net/publication/50949847_A_comprehensive_study_of_Convergent_and_Commutative_Replicated_Data_Types>.

M. Shapiro, N. Preguiça, C. Baquero, and M. Zawirski, "Conflict-Free Replicated Data Types," in Stabilization, Safety, and Security of Distributed Systems, 2011, pp. 386-400. Retrieved from URL: <https://www.researchgate.net/publication/221540578_Conflict-Free_Replicated_Data_Types>.

Paulo S'ergio Almeida, Ali Shoker, and Carlos Baquero, "Delta State Replicated Data Types", arXiv:1603.01529v1 [cs:DC] Mar. 4, 2016. Retrieved from URL: <https://www.researchgate.net/publication/301854947_Delta_State_Replicated_Data_Types>.

* cited by examiner

PRESERVING EVENTUALLY CONSISTENT DISTRIBUTED STATE OF MULTI-LAYER APPLICATIONS

BACKGROUND

Applications and services, including those implemented for the Internet of Things (IoT), are designed according to layered stack architecture. In a distributed application, stack layers are executed on multiple different threads or on distributed computing node instances. The stack is constructed by control flow over sequential invocations from one layer to another in a sequence specified by an application logic. The system provides mechanisms to address and direct the flow of dependencies, controls, and data between layers. The dependencies between the layers are maintained in a steady state.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

A large-scale IoT application is a distributed application in which many IoT devices may participate as servers and/or clients. The different IoT devices may be resources of a telephone communication service provider network that are interconnected by the corresponding network infrastructures. The large-scale IoT application may be scalable to encompass additional resources (e.g., IoT devices and/or stack layer processing devices) in order to meet increasing demand of the many subscribers of the telephone communication service provider.

In a large-scale IoT application, different layers (or levels) of the stack may be suspended for an arbitrary time interval due to devices sleeping, clients being suspended and reactivated on a constrained device, loss of connectivity, etc. A large-scale IoT service is usually deployed in a load-balanced distributed hierarchical service with multiple levels of abstraction. Such IoT applications may require the processing of each new session to proceed from the bottom to the top. The states of the applications are kept for each layer (e.g. association of IP:port to session ID). The state of a higher layer may depend on the states of one or more lower layers. This traversal and building of a consolidated session state may happen from top to bottom in a single instance of the application.

In such an architecture, one or more layers may fall out of sync with the global state. For a distributed system, and specifically a massive IoT deployment, there may be middleboxes between devices and application servers, which may cause even faster loss of state than typical long-term sessions required for constrained IoT devices.

When any change (e.g., a state change) happens at any one level of the distributed application stack, e.g., if a process crashes and gets re-initiated on another thread, or if any component in a distributed deployment architecture fails, the stack loses the coherent state as the old layer instance no longer exists or is obsolete and the new instance has no dependency pointers to the adjacent layers of the stack. The application state becomes inconsistent and the resumption of normal operations requires the device to reconnect and rebuild the application state from the ground up (e.g., from the Connectivity Layer up to the Application Layer). The rebuilding of the application state may require or occur in several phases, e.g., the Fully Qualified Domain Name (FQDN) resolution, Network Address Translator (NAT) re-binding, Transport Layer Security/Datagram Transport Layer Security (TLS/DTLS) handshake, device registration, and re-sending of all Light Weight Machine to Machine (LwM2M) observation requests. This rebuilding process can be very expensive in terms of computing and communications resources. The rebuilding process also puts additional strains on the resources of the server-side distributed system, including excessive networking traffic, and server resource utilization. For example, for an active IoT Application over a narrowband IoT (NB-IoT) network, if a device goes into a Power Saving Mode (PSM), and then wakes up, the NAT binding may change, resulting in changes of the Internet Protocol (IP) address: port allocation, which may require expensive DTLS handshake process between clients and servers in order to resume normal operations.

To minimize re-building of the application state, each application layer may separately process the application state and not have to wait for propagation and stabilization of the application state throughout the entire application stack. However, re-building the application state at a first layer (e.g., a middle layer) may require a certain state/association to be preserved at a second layer (e.g., a lower layer). In distributed systems that support communications with multiple IoT devices, such preservation is not guaranteed as processing may occur at different distributed instances after a device wakes up.

For a highly distributed dynamic implementation in which the application stack (or application layers or logical layers) may be implemented across multiple threads or instances, some embodiments of the disclosure provide a method that preserves the global distributed state of the application stack by guaranteeing eventual consistency. Conflict-free convergent and commutative replicated data types (CRDTs or CmRDTs) are used to model, address, and synchronize individual stack layer instances as intersecting sets of state parameters in a distributed system. CRDTs are data structures that can be used in distributed computing to replicate data across multiple computers in a network. CRDT instances can be updated independently and concurrently, and a feature of CRDTs is that mathematically, it is always possible to resolve any inconsistencies between CRDTs that may arise.

In some embodiments, a peer-populated intermediate caching scheme with loose coupling and eventual consistency is implemented. Such a caching scheme may be in a star, a mesh, or a standard 2-level cache configuration. The caching scheme is used to store intermediate states and variable mapping in order to ensure session consistency regardless of the application stack layer at which the session resumption occurs after a device, such as an IoT device, wakes up.

In some embodiments, an application (e.g., an IoT application that administers or manages communications and/or operations involving IoT devices) is represented by a global superset formed by a union operation of all layered sets at a given time instant. If all layered sets are identified and are synchronized with reference to a global time, then the union operation of all layered sets may completely and unambiguously specify the global application state or global state of the application. For the application to function, a coherent state superset can be achieved or built by traversing the different logical layers. In a distributed architecture, the traversal of the different logical layers can be accomplished by setting up deterministic communication channels between layers.

For some embodiments, individual execution tracks are referred to as "threads". A "thread" may refer to individual physical or virtual computing nodes or instances of a runtime environment executing in a cluster, in which the computing nodes are connected via communication channels such as an IP network. A service or application is partitioned into multiple logical layers. In a distributed architecture, different logical layers of the application (i.e., application layers) may be residing in different computing threads (nodes), such that each stack layer may be executing on a different distributed thread. The state of each layer of the stack may arbitrarily change depending on a locally communicated change in the environment and/or other conditions.

At each logical layer, parameters are combined in a set that completely and explicitly defines the state of the layer. In some embodiments, each parameter is stored in a key: value pair, and the state of each layer may be described by a set of key:value pairs. In some embodiments, the connection between adjacent layers is specified by an "index", which is a key:value parameter pair that is common between adjacent stack layers.

For example, when Light Weight Machine to Machine (LwM2M) servers and clients are used for IoT applications, the underlying application stack may include the following layers: transport: IP/non-IP, data framing using User Datagram Protocol (UDP), encryption using transport layer security or Datagram Transport Layer Security (DTLS), application transport protocol using Constrained Application Protocol (CoAP), application layer using LwM2M, and mapping of the Software Client to a device and device account by an arbitrary device_ID, (e.g. universally unique identifier (uuid) or International Mobile Equipment Identity (IMEI), etc.).

Figure 1:
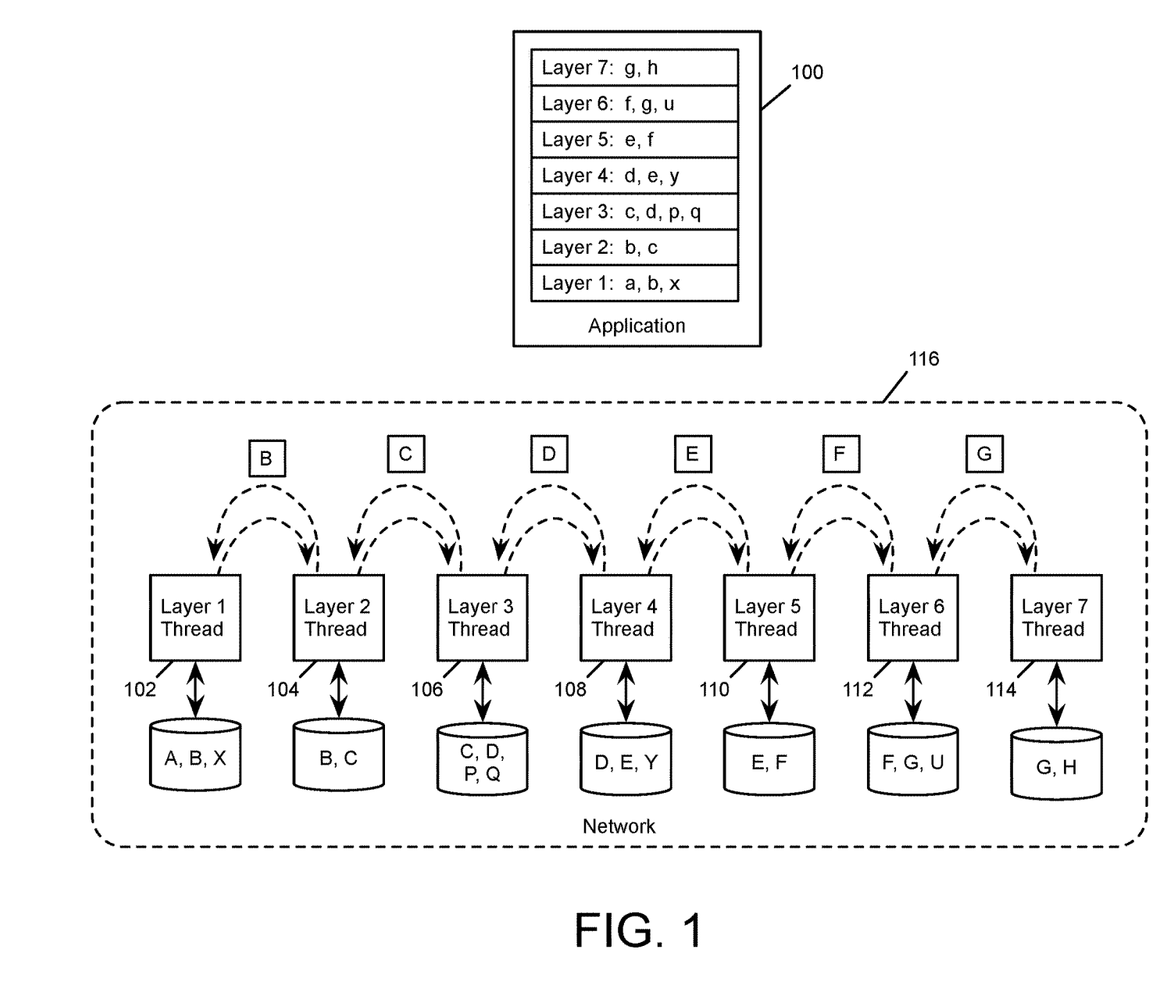
FIG. 1 conceptually illustrates an application whose application stack of logical layers are operating in a distributed system across multiple computing threads.

FIG. 1 conceptually illustrates an application 100 whose application stack includes logical layers that are operating in a distributed system across multiple computing threads 102-114. The computing threads 102-114 are hosted by one more computing devices that are interconnected by a network 116 implemented over a communications medium or network infrastructure. As illustrated, the application 100 includes logical layers 1 through 7. The computing threads 102, 104, 106, 108, 110, 112, and 114 operate corresponding logical layers 1, 2, 3, 4, 5, 6, and 7, respectively.

The network 116 is supported by a network infrastructure, which may include a core network of a telecommunications service provider. The network infrastructure may include routers, switches, or other types of data forwarding elements for conducting data traffic (e.g., packet traffic) between various network endpoints such as user devices, base stations, hotspots, and other types of computing resources. The core network also provides access to external networks such as the Internet. The core network may include components that provide services to the subscribers of a cellular network and track positions of the user devices. The core network may include a packet network, e.g., an Evolved Packet Core (EPC) that interconnects different components belonging to an Evolved Packet System (EPS). EPC is a framework for providing converged voice and data on a 4G Long Term Evolution (LTE) network. EPC unifies voice and data on an Internet Protocol (IP) service architecture. The EPC allows the operator of the cellular network to deploy and operate one packet network for 2G, 3G, 4G, 5G, wireless local area network (WLAN), and fixed access such as Ethernet, Digital Subscriber Line (DSL), cable, and fiber.

The network 116 may connect multiple clients with multiple servers that support operations of the application 100. The network may include one or more middleboxes that interconnect multiple clients with multiple servers. The clients of the application 100 may include one or more user devices. Each of the devices may be a desktop computer, a laptop computer, tablet computer, a smartphone, a smartwatch, a personal digital assistant (PDA), or any other computing device or mobile device that is capable of communicating with other devices via a network. The clients and servers of the application 100 may also include one or more IoT devices.

The servers of the application 100 may include backend application server instances. Each server may be a general-purpose computer, such as a desktop computer, tablet computer, laptop computer, server, or an electronic device that is capable of receiving inputs, processing the inputs, and generating output data. Each server may also be a virtual computing device such as a virtual machine or a software container that is hosted in a cloud. Each server may also be implemented by multiple computing devices, virtual machines, software containers, and/or so forth.

Each logical layer of the application 100 uses a set of layer parameters (also referred to as a layer set or a parameter set of a layer). In the example of FIG. 1, logical layer 1 (at thread 102) uses parameters A, B, and X; logical layer 2 (at thread 104) uses parameters B and C; logical layer 3 (at thread 106) uses parameters C, D, P, and Q; logical layer 4 (at thread 108) uses parameters D, E, and Y; logical layer 5 (at thread 110) uses parameters E and F; logical layer 6 (at thread 112) uses parameters F, G, and U; logical layer 7 (at thread 114) uses parameters G and H. The parameter set of each layer defines the state of the layer. The union of the parameters from the different layers of the application form a superset that is the global state of the application 100. In the example, the union superset that forms the state of the application includes parameters A, B, C, D, E, F, G, H, P, Q, U, X, and Y, which has values a, b, c, d, e, f, g, h, p, q, u, x, and y, respectively.

In some embodiments, information or parameters from different levels or layers of the application stack are stored independently as independent layer sets. In some embodiments, the layer sets are correlated by common members or intersections between different levels or layers of the IoT application. These intersecting sets of different layers can be used to identify parameters that belong to a common set, e.g., the union superset.

In the example of FIG. 1, some of the parameters that form the state of the application 100 are shared by, or common to, two or more layers. Specifically, parameter B is shared or jointly maintained by layers 1 and 2, parameter C is shared or jointly maintained by layers 2 and 3, parameter D is shared or jointly maintained by layers 3 and 4, parameter E is shared or jointly maintained by layers 4 and 5, parameter F is shared or jointly maintained by layers 5 and 6, and parameter G is shared or jointly maintained by layers 6 and 7. These shared parameters are the intersections between the layers, and are therefore also referred to as intersecting parameters. In some embodiments, layers that are adjacent to each other in the application stack intersect each other by sharing at least one parameter. In some embodiments, non-adjacent layers may have intersecting parameters, and a parameter may be common to three or more layers.

In some embodiments, set operations can be used to reconstruct the full stack superset from known individual layer sets. Table 1 below shows an application stack of an example (e.g., IoT) application consisting of six layers L1 through L6. A union of layer sets from L1 through L6 may fully define the stack state of the application. The union of the layer sets may be determined based on indices or parameters that are common to adjacent layers.

TABLE 1

Example Application Stack

| Application Layer/Description | Layer Parameters (Layer Sets) |
|---|---|
| L6 (Client device/Account parameters) | device_Id, endpoint_ID, device_parameters |
| L5 (Higher Level Application Session, e.g., LwM2M) | endpoint_ID, registration_ID, Protocol: LwM2M, time_to_live, resources, etc. |
| L4 (Application Session, e.g., Resource Observation session over CoAP) | endpoint_ID, observation_token, Protocol: CoAP, resources, timers, parameters, . . . |
| L3 (Application Transport Protocol, e.g., CoAP) | endpoint_ID, sid, destination_ID, resource_Directory, content_format, . . . |
| L2 (Encryption: Transport Layer Security, e.g., DTLS) | sid, cid, credentialId, credentials, cypher material, . . . |
| L1 (connectivity, e.g., IP/UDP) | cid, sourceIP, sourcePort, destinationIP, destinationPort, protocol |

In some embodiments, given that the information about the individual layers is consistent and up to date, when the layer set for a particular layer (e.g., L3) is known, the full stack can be recovered by querying a set store (e.g., a shared cache or a distributed cache) using set intersection operations. For example, an intersection operation from L3 based on the parameter "endpoint_ID" returns layers L4, L5, and L6 (since L3-L6 all have the parameter endpoint_ID); an intersection operation from L3 based on the parameter "sid" returns layer L2; and an intersection operation from L2 based on the parameter "cid" returns layer L1 ("sid" is the encrypted Session ID and the parameter "cid" is the connection ID.) The parameters "cid" and "sid" may therefore serve as the indices to map to upper layers. The full stack state can then be reconstructed as a union of layers L1, L2, . . . L6.

In some embodiments, in a distributed system, if any layer is independently updated, the system may restore the global state consistency by retrieving the adjacent layer parameters by querying the set store to return the intersection by an adjacent layer index. If a parameter is changed at L1 (e.g., IP address:port combination is changed due to NAT re-binding at L1 on a different or new thread), the system may perform an intersection operation from L1 based on the parameter "cid", which returns L2, and the thread executing L2 is then correspondingly updated.

As mentioned, a distributed application may be modeled as layered components completely specified by their parameter sets, that execute on various distributed threads (or nodes). In some embodiments, each thread executing an application layer can identify and reach one or more threads executing adjacent layers such that a consistent state for the distributed application can be constructed and maintained. In example embodiments, a thread that corresponds to a logical layer keeps a local copy of its set of layer parameters in a local cache. The different layers may each make changes to the local copies of their own layer parameters and propagate those changes to other layers through a global shared cache or through point-to-point connections among the threads.

Figure 2:
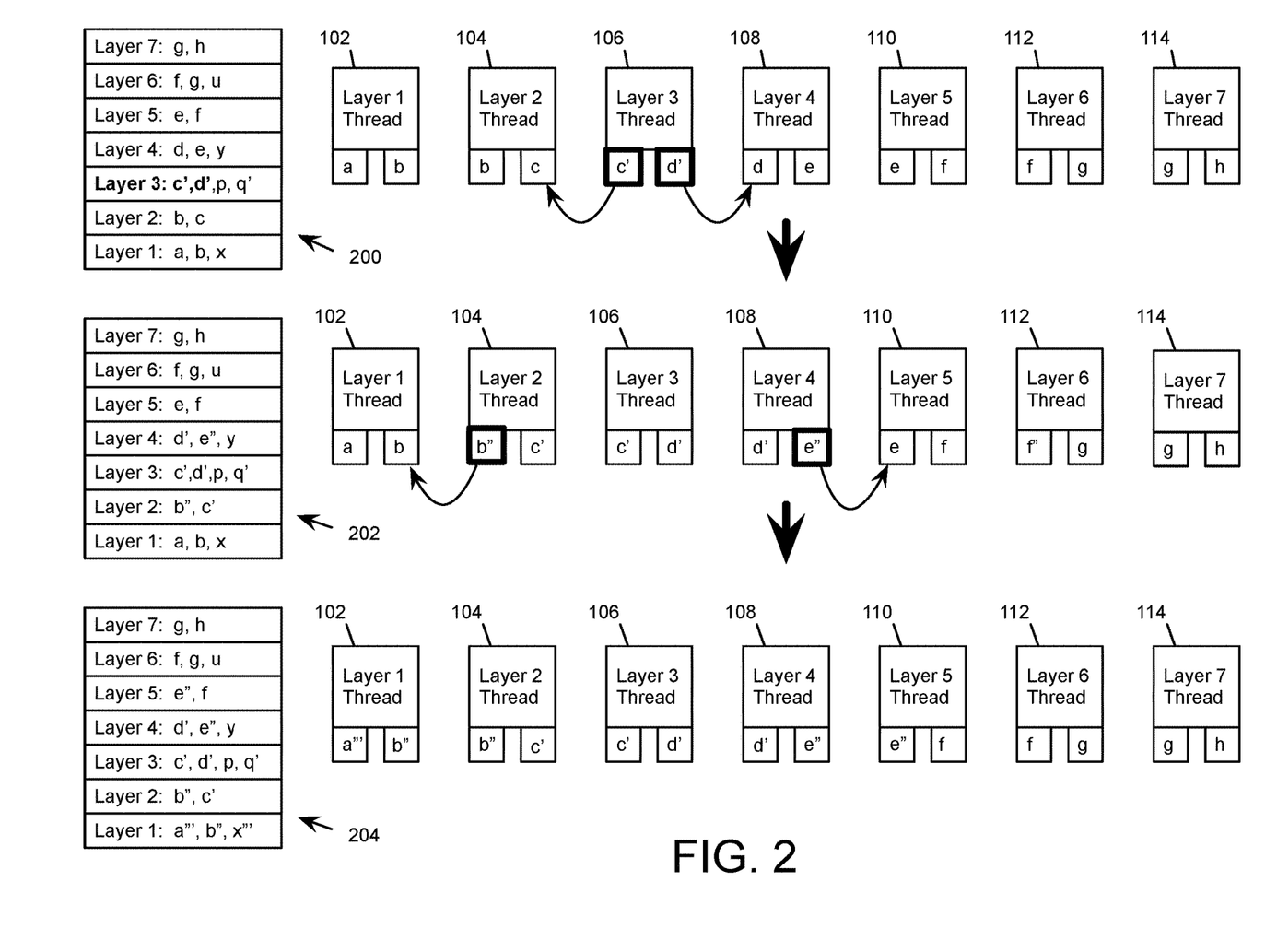
FIG. 2 conceptually illustrates maintaining global state consistency by identifying and updating intersecting parameters common to adjacent layers.

FIG. 2 conceptually illustrates maintaining global state consistency by identifying and updating intersecting parameters common to adjacent layers. For the application 100, the figure illustrates changes to parameters in individual layers being propagated to other layers, thereby effectuating a change in global state of the application. The figure illustrates the application stack in three different and sequential application states 200, 202, and 204.

As illustrated in FIG. 1, the global state of the application 100 is described by parameters A, B, C, D, E, F, G, H, P, Q, U, X, and Y. Prior to the any state changes, the parameters A, B, C, D, E, F, G, H, P, Q, U, X, and Y have values a, b, c, d, e, f, g, h, p, q, u, x, and y, respectively. The application state 200 corresponds to an initial change in the state of the application 100. As illustrated, at this application state, layer 3 thread 106 has updated the values of parameters C and D (have values c' and d'). This change is communicated to layers 2 and 4, which respectively also maintain parameters C and D, and reflected in the next application state 202. The layer 3 thread 106 may identify the layer 2 thread 104 and the layer 4 thread 108 by using pointers that identify those threads, e.g., pointers that point to memory locations in a global cache that store parameter C from layer 2 and parameter D from layer 4.

At the application state 202, the updated C and D parameters (having values c' and d') have been communicated to layer 2 and layer 4 respectively. Based on the updated C and D parameters, the layer 2 thread 104 and the layer 4 thread 108 make further computations and update other parameters. Specifically, the layer 2 thread 104 in state 202 updates parameter B to having value b" and then communicates the new value b" to the layer 1 thread 102. Layer 4 updates parameter E to having value e" and then communicates the new value e" to the layer 5 thread 110.

At the application state 204, the updated parameters B and E (having values b" and e") have been communicated to layers 1 and 5, respectively. Based on the updated B and E parameters, the layer 1 thread 102 makes further computations and changes parameter A to having value a''', while the layer 5 thread 110 makes no further changes to its parameters.

After the application state 204, the global state of the application stabilizes and no further changes to layer parameters are made and the states of the different logical layers are consistent with each other. The global set of application, i.e., the parameters A, B, C, D, E, F, G, H, P, Q, U, X, and Y, now have values a''', b''', c', d', e''', f, g, h, p, q', u, x''', x, respectively.

In some embodiments, by construction, adjacent layers of the application have one or more common parameters or indices, allowing mapping of parameters of one layer to parameters of another layer. For example, IP:port is mapped to DTLS session ID; DTLS session ID is mapped to endpoint_ID; endpoint_ID is mapped to LwM2M Registration; and Registration is mapped to observation tokens TKNs. Such parameters can be found by performing a set intersection operation on adjacent sets. Sets may also have common parameters with other layers. In some embodiments, the adjacent layers can be identified by executing a set intersection operation on a global store of all layer sets, and the full state of the application stack can be recovered by executing a set union operation on all identified adjacent sets.

In some embodiments, between the different layers of the application, information may be shared by exchanging CRDTs implemented as OR-Sets (Observed-Remove Sets) or Delta CRDT (only recently applied changes to a state are disseminated instead of the entire state). In the example of FIG. 2, the parameters B, C, D, and E may be OR-Set CRDTs or Delta CRDTs. To communicate a changed parameter that is an OR-Set CRDT to another layer, the entire parameter is delivered to the other layer and merged with the other layer's local copy of the OR-Set CRDT. To communicate a changed parameter that is a Delta CRDT, only the delta caused by the change is delivered to the other layer.

Any update to any individual layer instance results in the eventually consistent update of all instances. In some embodiments, information required to address and read a layer component are specified as separate CRDTs. The distributed application state then can be presented as a multilayer superset of CRDTs as follows: (up-layer, current layer, down-layer graph). The address/pointer here is the set of parameters needed for the current thread to have information where to send CRDT updates of its current state. Each layer state CRDT has a pointer/address to the adjacent layer, forming a linked list of CRDTs.

Figure 3:
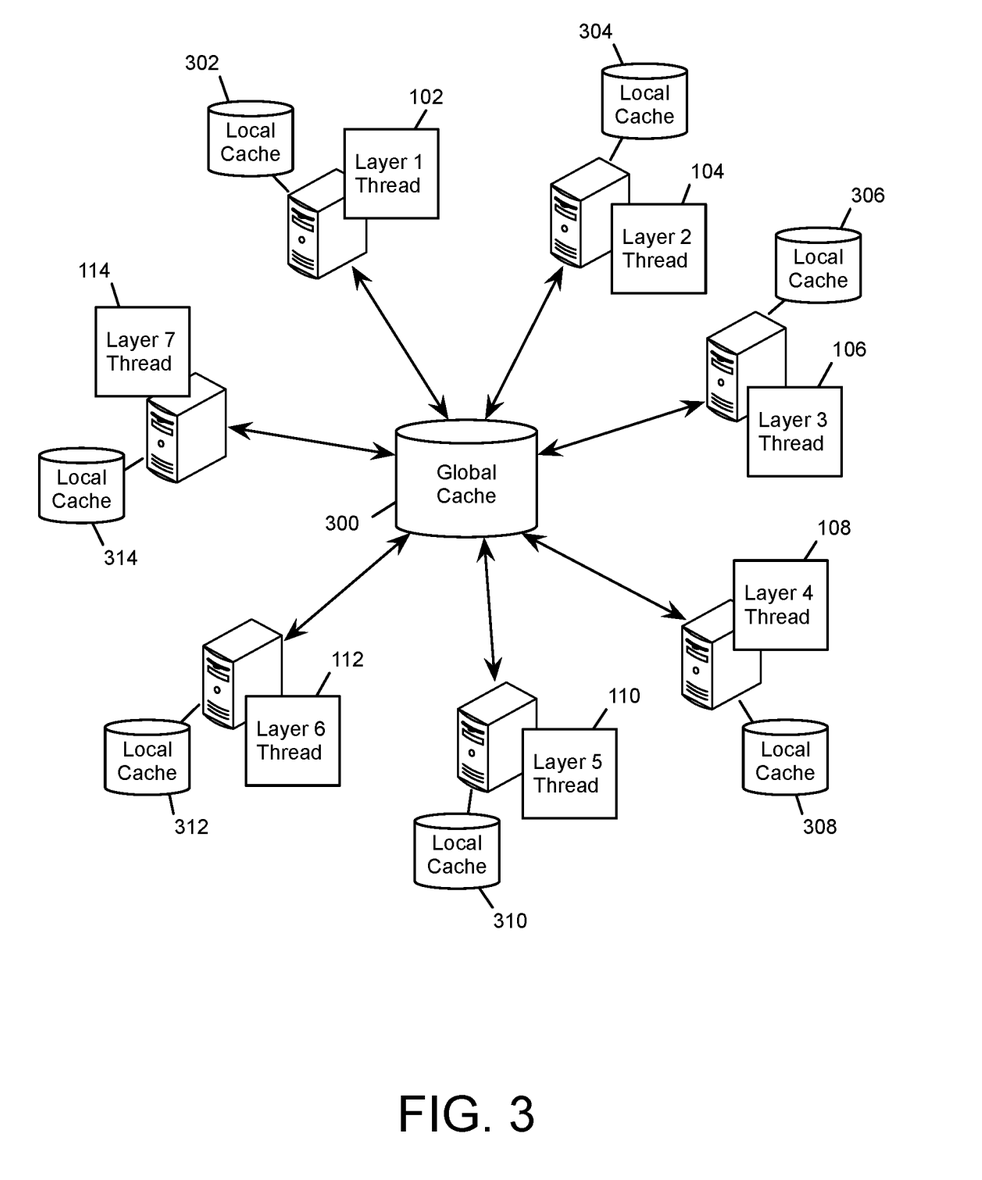
FIG. 3 illustrates the threads of the different logical layers arranged in a star topology around a shared global cache.

In some embodiments, instances of the different layers form a star topology with one entity implementing a shared set or shared cache as a hub (e.g. using Redis memory store). In a star topology, each layer communicates only with the synchronization store thread (shared cache) to synchronize and update its state. This topology may be mapped to a shared global cache. FIG. 3 illustrates the threads of the different logical layers arranged in a star topology around a shared global cache 300, such that the global cache 300 is globally accessible by each of the threads running layers of the stack of the application 100.

In some embodiments, a 2-level cache is used to exchange CRDTs between the different layers of the application. In a 2-level cache topology, in addition to the shared global cache 300, local caches associated with individual layers (or threads) are used to store local replicas of the layer parameters (including parameter sets shared by adjacent or intersecting layers). The replica layer parameter sets are also updated in addition to the main executing layer on the thread. Routine asynchronous synchronization may take place between the shared global cache 300 and the local caches of the different layers. In the example, the threads 102, 104, 106, 108, 110, 112, 114 have local caches 302, 304, 306, 308, 310, 312, 314, respectively. The local caches are in routine synchronization with the global cache 300.

Additional set operations in addition to an eventually consistent update may be defined, e.g., if a local cache is missing certain information (cache miss), or if there is a reason to consider the information in the local cache incorrect (e.g. if an operation based on the replica parameters failed), then the main executing layer (or a main executing thread) may query the shared global cache for information to update the local cache. In some embodiments, time-out and/or retry logic may be implemented to ensure successful state propagation between different threads operating adjacent layers (such that parameters updated by one application layer can be successfully delivered to another application layer.)

In some embodiments, one thread (or location) is dedicated as a storage and common synchronization node for all CRDTs updates. The application topology and the up/down layer address information are the same as or similar to the 2-layer cache, except the adjacent layer identifier may have to be different since one thread executing one of the application layers is now used as the dedicated storage and common synchronous node.

Figure 4:
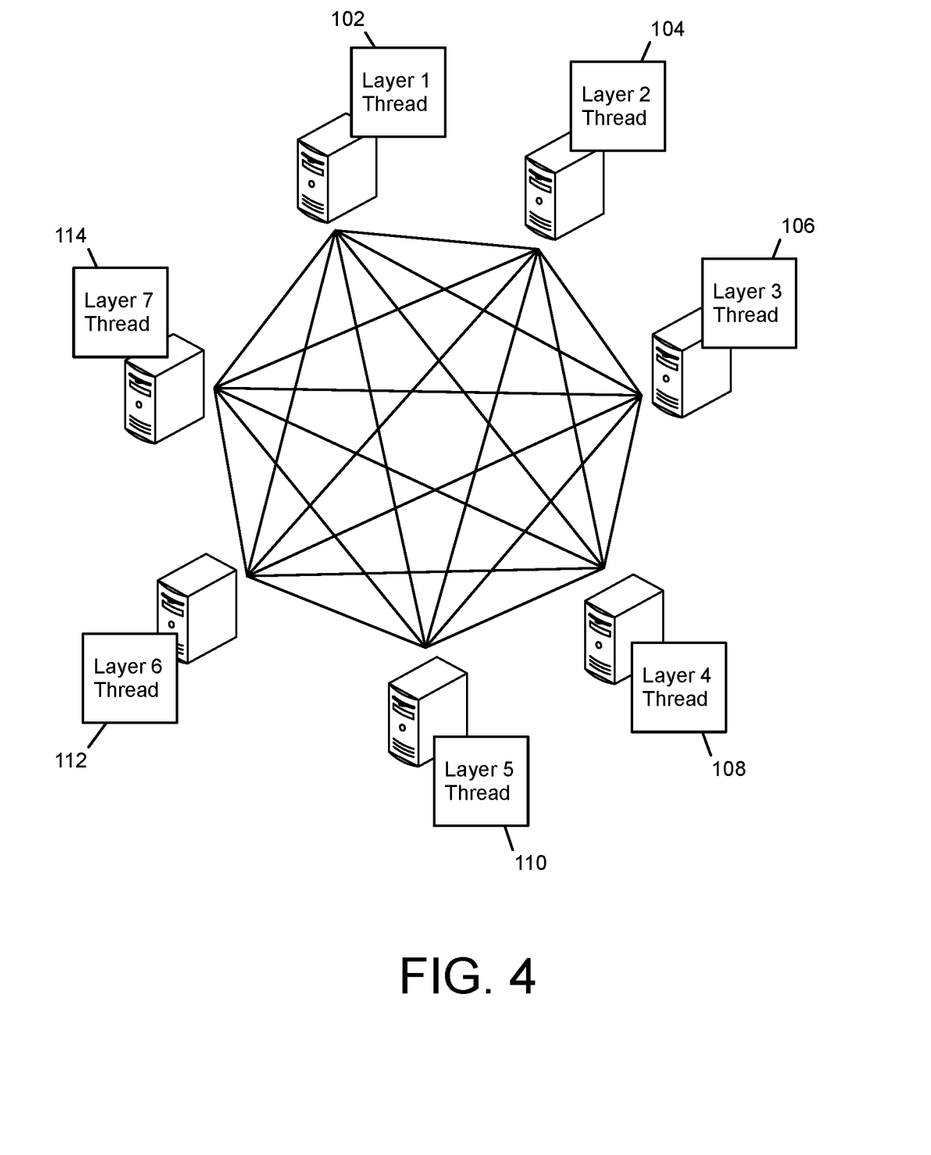
FIG. 4. conceptually illustrates the application stack of the application operating on threads that are in a peer-to-peer mesh topology.

In some embodiments, the exchange of CRDTs may also be implemented based on a peer-to-peer topology in a mesh in which all instances communicate directly with each other. FIG. 4. conceptually illustrates the application stack of the application 100 operating on threads that are in a peer-to-peer mesh topology. As illustrated, the threads running the different layers of the application have direct communications pathways with each other in the peer-to-peer mesh topology. A thread of a logical layer can communicate an updated parameter directly to the parameter's corresponding adjacent or intersecting layer or layers, without going through a global cache.

In a peer-to-peer topology, each thread stores the pointer information to threads where adjacent operations are executed in local layer CRDT. Whenever the state of a layer (CRDT parameters) changes, the CRDT update is sent to a thread where an adjacent layer is executed. On the other hand, whenever an adjacent layer process migrates to another thread, the pointer/address of a CRDT update is propagated to all peer threads identified in the adjacent process pointers. In some embodiments, CRDTs of the adjacent processes are stored locally at the threads operating the different application layers. Each thread in turn receives CRDT updates from related peer threads. Additionally, on demand, the adjacent peer threads can be queried to retrieve the most recent layer parameters or state. In some embodiments, one peer is elected as a leader, acting as an aggregation proxy for handling outside requests and distributing the load associated with the outside requests to a cluster of computing nodes. In some embodiments, such a topology is implemented using a service discovery solution, e.g. Apache ZooKeeper, and combines the advantages of peer-to-peer and centralized shared cache approaches. In some embodiments, a hybrid topology is used, and the CRDTs describing pointers/addresses to the threads executing layer level operations can be stored in a shared centralized repository or global shared cache similarly to a typical service discovery system. This information (light metainformation) is replicated/updated and stored locally on each thread. The execution layer CRDTs are then distributed in a peer-to-peer topology.

The following is an example full stack state synchronization procedure for a system in which a client is connected to several server components. In the example procedure, an application-specific sequence is used to traverse the application stack from bottom to top, while on the client side the traversal of the application stack occurs from top to bottom. Furthermore, all updates are executed based on layer states as defined in CRDTs (e.g., OR-Set.) In some embodiments, fault tolerance may be enhanced by explicitly specifying a fault condition for a layer, e.g. an update timeout when the layer fails.

1. A client connection is initialized. A lowest level server component (e.g., a thread running L1, or L1 thread) is initialized, and its parameters are stored locally in a layer state CRDT. An adjacent processing layer (e.g., L2) is then invoked. The adjacent layer is identified from the lowest level component by using an up-layer pointer. The adjacent layer may be operating on a different thread (L2 thread). The thread running the lowest application layer then sends its layer state CRDT to a shared cache, and locally stores (caches) the layer state CRDT for the next (higher) layer or adjacent layer.

2. The shared cache stores both L1 and L2 CRDTs. A local configuration is created to send CRDT updates to the L1 thread and the L2 thread.

3. The process of CRDT update then repeats to propagate the application state up the application stack until a connected, global application state (stable active state) is established. At this point all threads executing different layers of the application stack have local caches of both upstream and downstream parameter sets established, ensuring seamless application logic flow up and down the stack, and coherent distributed application state.

4. Upon any changes (creation, update, addition, removal) of any layer Lx CRDTs, a downstream update is propagated via the shared cache to all dependent layer Lx components.

5. If a local upstream copy of a layer parameter is stale, and a lower level component tries to pass logic to a higher level component defined in the local CRDT, and fails (e.g., latest update has not propagated yet), the lower level component then may retrieve an updated state from the shared cache CRDT repository.

6. If a particular layer is re-initiated on another thread with new parameters, all CRDTs are updated by propagating changes via the shared cache, thereby ensuring the eventual consistency of the distributed state.

Example Computing Device

Figure 5:
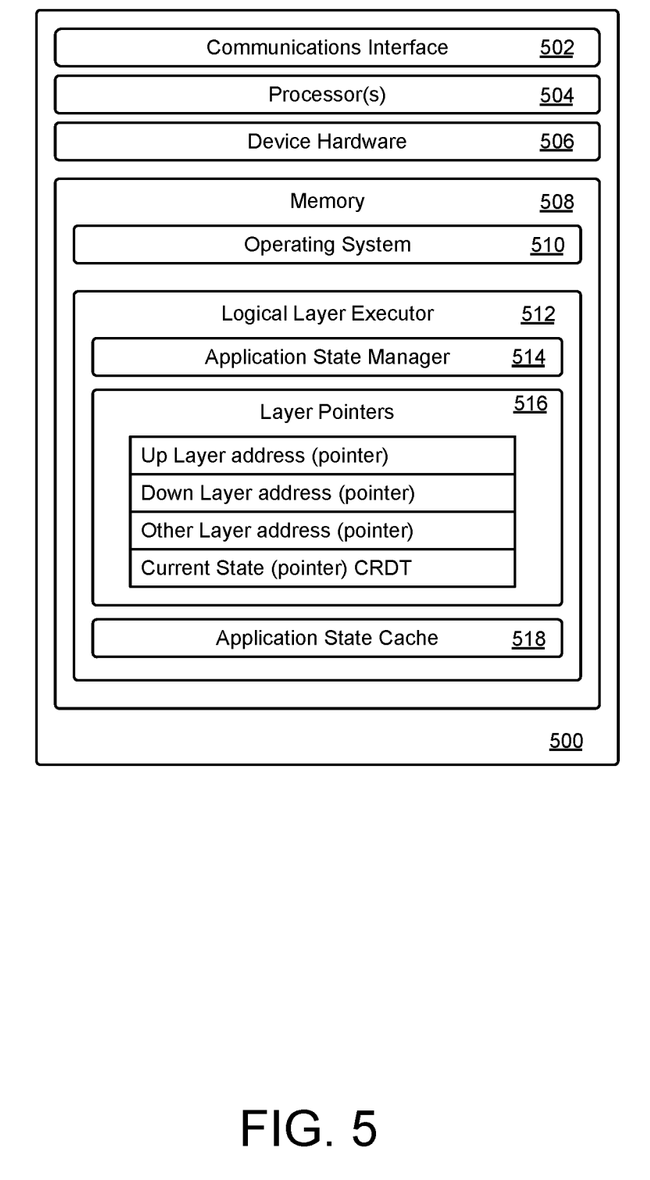
FIG. 5 is a block diagram showing various components of an example computing device capable of operating one or more threads for running logical layers of a distributed application.

FIG. 5 is a block diagram showing various components of an example computing device 500 capable of operating one or more threads for running logical layers of a distributed application (e.g., the application 100), consistent with an embodiment of the disclosure. The computing device 500 may operate one or more of the threads 102-114.

The computing device 500 may be a general-purpose computer, such as a desktop computer, tablet computer, laptop computer, server, or an electronic device that is capable of receiving inputs, processing the inputs, and generating output data. The computing device 500 may also be a virtual computing device such as a virtual machine or a software container that is hosted in a cloud. Alternatively, the computing device 500 may be substituted with multiple computing devices, virtual machines, software containers, and/or so forth.

The computing device 500 may be equipped with one or more of the following: a communications interface 502, one or more processors 504, device hardware 506, and memory 508. The communications interface 502 may include wireless and/or wired communication components that enable the computing devices to transmit data to and receive data from other devices. The data may be relayed through a dedicated wired connection or via a communications network. The device hardware 506 may include additional hardware that performs user interface, data display, data communication, data storage, and/or other server functions.

The memory 508 may be implemented using computer-readable media, such as a computer-readable storage medium. Computer-readable media include, at least, two types of computer-readable media, namely computer-readable storage media and communications media. Computer-readable storage media may include volatile and non-volatile, removable and non-removable media implemented in any method or technology for storage of information such as computer-readable instructions, data structures, program modules, or other data. Computer-readable storage media may include, but are not limited to, random-access memory (RAM), read-only memory (ROM), electrically erasable programmable ROM (EEPROM) flash memory or other memory technology, compact-disc-ROM (CD-ROM), digital versatile disks (DVD) or other optical storage, magnetic cassettes, magnetic tape, magnetic disk storage or other magnetic storage devices, or any other non-transitory medium that can be used to store information for access by a computing device. As defined herein, computer-readable storage media do not consist of, and are not formed exclusively by, modulated data signals, such as a carrier wave. In contrast, communication media may embody computer-readable instructions, data structures, program modules, or other data in a modulated data signal, such as a carrier wave, or other transmission mechanisms.

The processors 504 and the memory 508 of the computing device 500 may implement an operating system 510 and a logical layer executor 512. The logical layer executor 512 includes an application state manager 514, a set of layer pointers 516, and an application state cache 518. The various software may include routines, program instructions, objects, and/or data structures that are executed by the processors 504 to perform specific tasks or implement specific abstract data types.

The operating system 510 may include components that enable the computing device 500 to receive and transmit data via various interfaces (e.g., user controls, communications interface, and/or memory input/output devices), as well as process data using the processors 504 to generate output. The operating system 510 may include a presentation component that presents the output (e.g., display the data on an electronic display, store the data in memory, transmit the data to another electronic device, etc.). The operating system 510 may include a hypervisor that allows the computing device to operate one or more virtual machines and/or virtual network components. Additionally, the operating system 510 may include other components that perform various additional functions generally associated with an operating system.

The logical layer executor 512 is a program that enables the computing device 500 to execute one layer of the application stack. For some embodiments, the logical layer executor 512 can be regarded as a thread that executes that one logical layer. The one logical layer operated by the thread can be referred to as the current logical layer. During execution of the current logical layer, the logical layer executor 512 may use and update the local copies of the parameter(s) of the logical layer.

The application state manager 514 is a software component that oversees the propagation of the state of the application. For example, the application state manager 514 may detect that the logical layer executor 512 has made a change to one of parameters of the current logical layer and attempts to propagate those changes to other threads running other logical layers. The application state manager 514 may use the addresses and pointers stored in the layer pointers 516 to determine where to send the parameter update, as the address provided by layer pointers 516 may map to a particular location in a global cache, a particular peer-to-peer connection with another thread of another logical layer, etc.

The application state manager 514 may also monitors the global cache and/or other threads for updates or modifications to any of the intersecting parameters (parameters that are shared by the current logical layer and other logical layers.) The application state manager 514 may use the addresses provided by the layer pointers 516 to determine where to monitor those changes. Once an updated to an intersecting parameter is detected, the application state manager 514 may retrieve and apply the update to the local copy of the intersecting parameter used by the logical layer executor 512.

The layer pointers 516 store various pointers or identifiers that are used to propagate state changes. The layer pointers 516 may store addresses that are associated with other logical layers having intersection with the current logical layer. Such addresses may map to locations in the global cache or peer-to-peer connections that correspond to other threads/logical layers. The layer pointers 516 may include an up-layer address that points to an adjacent layer in the stack that is above the current layer, a down-layer address that points to an adjacent layer in the stack that is below the current layer, and/or addresses of other layers that may or may not intersect the current logical layer. In some embodiments, the layer pointer 516 is a data structure that includes the current state of the current layer in CRDT, an up layer pointer for an adjacent up layer, and a down layer pointer for an adjacent down layer, such that the CRDTs of the different logical layers in different threads form a linked list of CRDTs.

The application state cache 518 may serve as the local cache of the current layer that store the updated version of the parameters of the current layer in a two-layer topology. In some embodiments, the application state cache 518 may also be accessed by other logical layers in a peer-to-peer topology. The application state cache 518 may also serve as the global cache (e.g., the global cache 300) of the entire application stack in a star topology.

Figure 6:
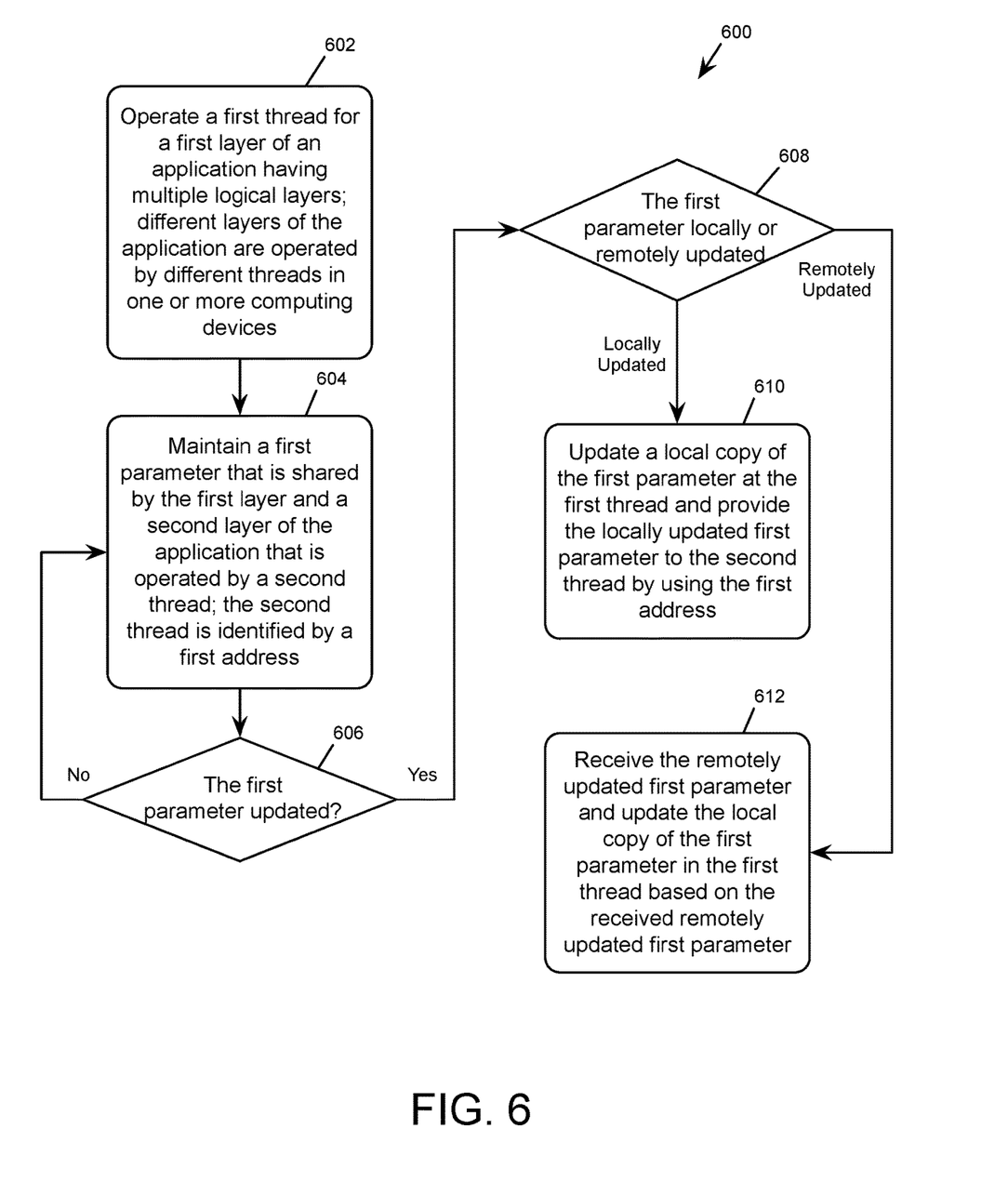
FIG. 6 conceptually illustrates a flow diagram of an example process performed by a computing device that hosts a computing thread for a logical layer of an application stack.

FIG. 6 conceptually illustrates a flow diagram of an example process 600 performed by a computing device that hosts a computing thread for a logical layer of an application stack. The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform particular functions or implement particular abstract data types. The order in which the operations are described is not intended to be construed as a limitation, and any number of the described blocks can be combined in any order and/or in parallel to implement the process.

At block 602, the computing device operates a first thread for a first layer of an application having multiple logical layers. Different layers of the application are operated by different threads in one or more computing devices. In some embodiments, the different threads operating the different logical layers share access to a global cache in a star topology. In some embodiments, each thread has its own local cache such that the local caches of the individual threads and the global cache are in a two-level cache configuration.

At block 604, the computing device maintains a first parameter that is shared by the first layer of the application and a second layer of the application (i.e., an intersecting parameter of the first and second layers). The first and second layers of the application may be adjacent layers of the application. The second layer is operated by a second thread that is identified by a first address. In some embodiments, the first parameter is a commutative replicated data type (CRDT) parameter that is shared by the first and second layers of the application.

At block 606, the computing device determines whether the first parameter has been updated. For example, the computing device may monitor specific address locations in the global cache or in local caches of adjacent layers. The computing device may also monitor incoming data traffic from other threads or query other threads. The computing device may be preprogrammed with address locations that are associated with adjacent layers with whom the current layer shares intersecting parameters. If the computing device determines that the first parameter has not been changed, the process returns to block 604. If the computing device determines that the first parameter has been changed, the process proceeds to 608.

At block 608, the computing device determines whether the first parameter is locally updated by the first thread or is remotely updated by the second thread. If the first parameter is locally updated by the first thread, the process proceeds to block 610. If the first parameter is remotely updated at the second thread, the process proceeds to block 612.

At block 610, the computing device updates a local copy of the first parameter at the first thread and provides the locally updated first parameter to the second thread by using the first address. In some embodiments, the computing device provides the locally updated first parameter to the second thread by transmitting the locally updated first parameter to the global cache that is shared by multiple different threads operating the multiple layers of the application. In some embodiments, the computing device provides the locally updated first parameter to the second thread by transmitting the locally updated first parameter to a local cache of a second computing device that is operating the second thread.

At block 612, the computing device receives the remotely updated first parameter and updates the local copy of the first parameter at the first thread based on the received remotely updated first parameter. In some embodiments, the computing device receives the remotely updated first parameter from the global cache. In some embodiments, the computing device receives the remotely updated first parameter from the local cache of the second computing device that is operating the second thread.

Though not illustrated, the computing device may further maintain a second parameter that is shared by the first layer and a third layer of the application that is operated by a third thread. As such, the state of the first layer includes the first parameter and the second parameter. The third thread is identified by a second address (or pointer). when the second parameter is locally updated at the first thread, the computing device updates a local copy of the first parameter at the first thread and providing the locally updated second parameter to the third thread by using the second address. When the second parameter is remotely updated at the third thread, the computing device receives the remotely updated second parameter and updating the local copy of the second parameter at the first thread based on the received remotely updated second parameter.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising:
   operating, at a first computing device, a first thread for a first logical layer of an application stack having logical layers operating in a distributed system across threads operated by computing devices, each of the logical layers operating at a different one of the computing devices;
   maintaining, in a local cache at the first computing device, one or more parameters that are shared by the first logical layer and a one or more of the other logical layers of the application stack, wherein the one or more parameters are implemented as commutative replicated data types (CRDTs);
   receiving an update to a first parameter of the one or more parameters;
   locally updating the first parameter at the first thread with the received update and storing the first parameter update in the local cache; and
   recovering the full application stack, including:
      querying a set store of parameters using set intersection operations to determine parameters that are shared by the first logical layer and other logical layers of the application stack;
      receiving, from the set store in response to the query, a determination that the first parameter is shared with a second logical layer adjacent to the first logical layer in the application stack, wherein the second logical layer is operated at a second computing device by a second thread that is identified by a first address; and
      propagating the first parameter update to all of the other logical layers of the application stack that maintain the first parameter, the propagating including providing, based on the determination that the first parameter is shared by the first logical layer and the second logical layer, the first parameter update to the second thread by using the first address,
   wherein the set store is shared by the threads operating the logical layers;
   wherein the first parameter is part of a global superset of parameters stored in the set store and formed by a union operation of all parameters maintained by all of the logical layers of the application stack; and
   wherein the global superset of parameters is the global state of the application stack.

2. The computer-implemented method of claim 1, further comprising maintaining, in the local cache at the first computing device, a second parameter of the one or more parameters, wherein the second parameter is shared by the first logical layer and a third logical layer of the application stack that is operated by a third thread at a third computing device that is identified by a second address.

3. The computer-implemented method of claim 2, further comprising:
   receiving an update to the second parameter;
   locally updating the second parameter at the first thread with the received update and storing the updated second parameter in the local cache;
   receiving, from the set store in response to the query, a determination that the second parameter is shared with the third logical layer of the application stack; and
   propagating the second parameter update to all of the other logical layers of the application stack that maintain the second parameter, the propagating including providing, based on the determination that the second parameter is shared by the first logical layer and the third logical layer, the second parameter update to the third thread by using the second address.

4. The computer-implemented method of claim 1, wherein the first parameter update is transmitted to a local cache of the second computing device that is operating the second thread.

5. A computing device comprising:
   one or more processors; and
   memory storing layer pointers, an application state cache, and a plurality of computer-executable components that are executable by the one or more processors to perform a plurality of actions, the plurality of actions comprising:
      operating a first thread for a first logical layer of an application stack having logical layers operating in a distributed system across threads operated by computing devices, wherein each of the logical layers operates at a different one of the computing devices and is associated with a different address stored in the layer pointers, and the layer pointers include an up-layer address that points to an adjacent logical layer in the application stack that is above a current logical layer and a down-layer address that points to an adjacent logical layer in the application stack that is below the current logical layer;
      maintaining, in the application state cache, one or more parameters that are shared by the first logical layer and one or more of the other logical layers of the application stack, wherein the one or more parameters are implemented as commutative replicated data types (CRDTs);
      locally updating the first parameter at the first thread with the received update and storing the first parameter update in the application state cache; and
      recovering the full application stack, including:
         querying a set store of parameters using set intersection operations to determine parameters that are shared by the first logical layer and other logical layers of the application stack;
         receiving, from the set store in response to the query, a determination that the first parameter is shared with a second logical layer adjacent to the first logical layer in the application stack, wherein the second logical layer is operated at a second computing device by a second thread that is identified by a first address stored in the layer pointers; and
         propagating the first parameter update to all of the other logical layers of the application stack that maintain the first parameter, the propagating including providing, based on the determination that the first parameter is shared by the first logical layer and the second logical layer, the first parameter update to the second thread by using the first address, wherein the set store is shared by the threads operating the logical layers;

wherein the first parameter is part of a global superset of parameters stored in the set store and formed by a union operation of all parameters maintained by all of the logical layers of the application stack; and wherein the global superset of parameters is the global state of the application stack.

6. The computing device of claim 5, wherein the plurality of actions further comprise maintaining, in the application state cache, a second parameter of the one or more parameters, wherein the second parameter is shared by the first logical layer and a third logical layer of the application stack that is operated by a third thread at a third computing device that is identified by a second address in the layer pointers.

7. The computing device of claim 6, wherein the plurality of actions further comprise:
receiving an update to the second parameter;
locally updating the second parameter at the first thread with the received update and storing the updated second parameter in the application state cache;
receiving, from the set store in response to the query, a determination that the second parameter is shared with a third logical layer of the application stack; and
propagating the second parameter update to all of the other logical layers of the application stack that maintain the second parameter, the propagating including providing, based on the determination that the second parameter is shared by the first logical layer and the third logical layer, the second parameter update to the third thread by using the second address.

8. The computing device of claim 5, wherein:
the first parameter update is transmitted to an application state cache of the second computing device that is operating the second thread.

9. One or more non-transitory computer-readable storage media of a computing device storing computer-executable instructions that upon execution cause one or more processors to perform acts comprising:
operating a first thread for a first logical layer of an application stack having logical layers operating in a distributed system across threads operated by computing devices, wherein each of the logical layers operates at a different one of the computing devices and is associated with a different address stored in layer pointers, and the layer pointers include an up-layer address that points to an adjacent logical layer in the application stack that is above a current logical layer and a down-layer address that points to an adjacent logical layer in the application stack that is below the current logical layer;
maintaining, in an application state cache, one or more parameters that are shared by the first logical layer and one or more other logical layers of the application stack, wherein the one or more parameters are implemented as commutative replicated data types (CRDTs);
locally updating the first parameter at the first thread with the received update and storing the first parameter update in the application state cache; and
recovering the full application stack, including:
querying a set store of parameters using set intersection operations to determine parameters that are shared by the first logical layer and other logical layers of the application stack;
receiving, from the set store in response to the query, a determination that the first parameter is shared with a second logical layer adjacent to the first logical layer in the application stack, wherein the second logical layer is operated at a second computing device by a second thread that is identified by a first address stored in the layer pointers; and
propagating the first parameter update to all of the other logical layers of the application stack that maintain the first parameter, the propagating including providing, based on the determination that the first parameter is shared by the first logical layer and the second logical layer, the first parameter update to the second thread by using the first address wherein the set store is shared by the threads operating the logical layers;

wherein the first parameter is part of a global superset of parameters stored in the set store and formed by a union operation of all parameters maintained by all of the logical layers of the application stack; and wherein the global superset of parameters is the global state of the application stack.

10. The one or more non-transitory computer-readable storage media of claim 9, wherein the acts further comprise maintaining, in the application state cache, a second parameter of the one or more parameters, wherein the second parameter is shared by the first logical layer and a third logical layer of the application stack that is operated by a third thread at a third computing device that is identified by a second address in the layer pointers.

11. The one or more non-transitory computer-readable storage media of claim 10, wherein the acts further comprise:
receiving an update to the second parameter;
locally updating the second parameter at the first thread with the received update and storing the updated second parameter in the application state cache;
receiving, from the set store in response to the query, a determination that the second parameter is shared with a third logical layer of the application stack; and
propagating the second parameter update to all of the other logical layers of the application stack that maintain the second parameter, the propagating including providing, based on the determination that the second parameter is shared by the first logical layer and the third logical layer, the second parameter update to the third thread by using the second address.

12. The one or more non-transitory computer-readable storage media of claim 9, wherein:
the first parameter update is transmitted to an application state cache of the second computing device that is operating the second thread.

* * * * *